United States Patent
Hatanaka et al.

[11] Patent Number: 5,705,587
[45] Date of Patent: Jan. 6, 1998

[54] ROOM-TEMPERATURE-CURABLE SILICONE ELASTOMER COMPOSITION

[75] Inventors: Hidekatsu Hatanaka; Seiji Hori, both of Chiba Prefecture, Japan

[73] Assignee: Dow Corning Toray Silicone Co., LTD., Tokyo, Japan

[21] Appl. No.: 791,306

[22] Filed: Jan. 30, 1997

[30] Foreign Application Priority Data

Jan. 31, 1996 [JP] Japan ................................. 8-037488
May 31, 1996 [JP] Japan ................................. 8-160518

[51] Int. Cl.$^6$ ................................................ C08G 77/18
[52] U.S. Cl. ................... 528/17; 528/18; 528/34; 528/41; 528/901; 525/477
[58] Field of Search .......................... 528/17, 18, 34, 528/41; 525/477

[56] References Cited

U.S. PATENT DOCUMENTS

| | | | |
|---|---|---|---|
| 3,271,359 | 9/1966 | Bluestein | 525/477 |
| 3,635,887 | 1/1972 | Polmanteer | 525/477 |
| 4,687,829 | 8/1987 | Chaffee et al. | 528/17 |
| 5,300,612 | 4/1994 | Saruyama | 528/17 |

FOREIGN PATENT DOCUMENTS

| | | |
|---|---|---|
| 83167 | 4/1988 | Japan. |
| 9875 | 6/1992 | Japan. |

OTHER PUBLICATIONS

Japanese Industrial Standard—JIS A 5758—1992.

*Primary Examiner*—Margaret W. Glass
*Attorney, Agent, or Firm*—Roger H. Borrousch

[57] ABSTRACT

A room-temperature-curable silicone elastomer composition obtained from diorganopolysiloxane that is endblocked by silanol at both molecular chain terminals and diorganopolysiloxane that is endblocked at one molecular chain terminal by silanol and at the other terminal by trialkylsiloxy; an alkoxy functional silane; an organopolysiloxane resin; a curing catalyst; and a diorganopolysiloxane that contains at least 2 carboxyl groups. The room-temperature-curable silicone elastomer composition has an excellent pre-cure workability and cures into a low-modulus, high-elongation silicone elastomer.

9 Claims, No Drawings

ROOM-TEMPERATURE-CURABLE SILICONE ELASTOMER COMPOSITION

BACKGROUND OF THE INVENTION

1. Field of the Invention

This invention relates to compositions that cure at room temperature into silicone elastomers. More particularly, this invention relates to a composition of this type whose post-cure physical properties can be varied over a wide range.

2. Description of the Prior Art

Compositions that cure at room temperature into silicone elastomer are already known and are widely used in the commercial and industrial spheres. The room-temperature-curing mechanisms include hydrosilylation-based curing, UV-initiated curing, and curing by condensation between silanol and a silicon-bonded functional group. Among these, condensation-curing silicone elastomer compositions have come to be widely used as adhesives, coatings, and sealants because they have a number of distinctive features, such as the ease with which they develop adhesiveness at room temperature, their good resistance to cure inhibition by contaminants present in the curing environment, their ability to cure in a short period of time simply upon mixing the base and curing agent, the long-term storage stability of their two-part formulations, and their ability to cure upon standing in the atmosphere. However, compositions of this type are also subject to limitations on their mechanical properties imposed by the necessity for maintaining pre-cure workability, for example, the mixability, pourability, and finishability in manual operations. In specific terms, the molecular weight of the diorganopolysiloxane main ingredient must be held below a certain level in order to support and facilitate the workability, but this restriction also makes it difficult to hold the stiffness, which is manifested through such properties as the modulus and durometer of the cured elastomer, below particular levels. A fundamental approach to solving this problem is the combined use of a polyfunctional crosslinker and a difunctional chain extender. This approach results in a reduced post-cure crosslink density because the diorganopolysiloxane chain undergoes extension (chain elongation) at the same time as crosslinking during the curing reaction. The following two methods have been proposed in this regard: (1) the combined use of siloxane having 2 N,N-dialkylaminoxy groups in each molecule and siloxane having 3 N,N-dialkylaminoxy groups in each molecule, and (2) the combined use of silane having 2 N-alkylacetamide groups in each molecule and silane having 3 N-alkylacetamide groups in each molecule. There are, however, drawbacks to each of these methods. In the case of the first method, i.e., use of N,N-dialkylaminoxy-functional siloxane, the curing reaction produces N,N-dialkylhydroxylamine as a by-product, and this hydroxylamine has an unpleasant odor. Moreover, the hydroxylamine is strongly basic and causes diorganopolysiloxane scission, and thus cure inhibition, when the ambient temperature becomes even slightly elevated. Finally, this method is also economically problematic because the N,N-dialkylaminoxy-functional siloxanes are expensive. In regard to the second method, i.e., use of N-alkylacetamide-functional silanes, curing is again accompanied by unpleasant odor, in this case from N-alkylacetamide. In addition, when an active hydrogen-containing compound such as an alcohol is present in the ambient, the N-alkylacetamide group undergoes a substitution reaction to, for example, the alkoxy group, which again results in cure inhibition. This method is also economically problematic because the N-alkylacetamide-functional silanes are expensive. To avoid the use of specialized and expensive functional groups as in the preceding two methods, there have also been proposals to the effect that chain elongation and crosslinking be carried out using functional groups that are already in wide use and that are not accompanied by secondary reactions. Japanese Patent Application Laid Open [Kokai or Unexamined] Number Sho 63-83167 (1988) teaches the use of, for example, $RNHCH_2MeSi(OMe)_2$ as chain extender. However, not only is it quite difficult to synthesize this chain extender economically, but it is also so difficult to strike a stable balance with the crosslinker in this case that practical applications are not possible. Saruyama in U.S. Pat. No. 5,300,612, issued Apr. 5, 1994, and equivalent to Japanese Patent Application Laid Open [Kokai or Unexamined] Number Hei 6-9875 (1994) proposes the use $[(CH_3)_3SiO]_2Si(OMe)_2$ as chain extender. However, when the actual use of this chain extender is attempted, one finds that practical applications are not possible due to a large increase in the modulus after degradation testing. Chaffee et al in U.S. Pat. No. 4,687,829, issued Aug. 18, 1987, proposed the use of $Ph[(CH_3)_3SiO]Si(OCH_3)_2$, but this compound does not provide the initial physical properties that are provided by the use of the N,N-dialkylaminoxy group. In addition, silicone building sealants for weather sealing service desirably have a durability performance that passes the 10030 or 9030 durability test for building sealants that is specified in Japanese Industrial Standard (JIS) A 5758. However, at the present time the only commercial building sealants that pass these tests are the above-described sealants that use N,N-dialkylaminoxy-functional silanes and sealants that use N-alkylacetamide-functional silanes. Sealants based on silanes having other functional groups cannot pass these tests.

SUMMARY OF THE INVENTION

As a result of extensive investigations directed to solving the problems outlined above, the inventors have already discovered a composition whose cure yields a low-modulus, high-elongation silicone elastomer that can pass the 10030 or 9030 durability test of JIS A 5758. This composition, which is the subject of allowed U.S. patent application Ser. No. 08/748,463, filed Nov. 8, 1996, by Hamada et al., and assigned to the same assignee as this application, and based on priority document Japanese Patent Application Number Hei 7-334003 (1995), filed in Japan on Nov. 29, 1995, consists of the blend of a higher fatty acid, for example, oleic acid, in a composition whose main ingredients are a special diorganopolysiloxane, organosiloxane resin, and organosilane. However, since ensuing investigations revealed that this composition had an unsatisfactory adherence for substrates, additional research was carried out that resulted in the present invention. In specific terms, the object of the present invention is to provide a room-temperature-curable silicone elastomer composition that has an excellent pre-cure workability and that cures into a low-modulus, high-elongation silicone elastomer that exhibits a desirable stiffness. A more particular object of the present invention is to provide a highly adhesive room-temperature-curable silicone elastomer composition that can pass the 10030 or 9030 durability test of JIS A 5758.

MEANS SOLVING THE PROBLEMS

The present invention is achieved by a room-temperature-curable silicone elastomer composition comprising (A) 100 weight parts of diorganopolysiloxane composed of
  (a) diorganopolysiloxane with a viscosity at 25° C. of 0.02 to 1,000 Pa.s that is endblocked by silanol at both molecular chain terminals and
  (b) diorganopolysiloxane with a viscosity at 25° C. of 0.1 to 1,000 Pa.s that is endblocked at one molecular chain terminal by silanol and at the other terminal by trialkylsiloxy in a molar ratio in the range from 1.0:0.3 to 1.0:3.0, preferably from 1.0:0.5, 1.0:0 to 1.0:3.0, moles of (a) to moles of (b);

(B) 0.1 to 2.0 weight parts of organosilane with the general formula

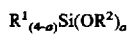

$R^1$ and $R^2$ each represent $C_1$ to $C_{20}$ monovalent hydrocarbon groups and a is 3 or 4 or partial hydrolyzate thereof;

(C) 5 to 30 weight parts of organopolysiloxane resin that is solid at ambient temperature and that is composed of the $R^3{}_3SiO_{1/2}$ and $SiO_{4/2}$ units in a molar ratio in the range from 0.5:1.0 to 1.2:1.0 and where $R^3$ is a $C_1$ to $C_{20}$ monovalent hydrocarbon group or the hydroxyl group (D) 0.01 to 20 weight parts curing catalyst; and (E) 0.5 to 10 weight parts diorganopolysiloxane having at least 2 —$R^4$—$COOR^5$ groups in each molecule and having the following average general formula

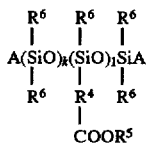

wherein $R^4$ is a divalent hydrocarbon group, $R^5$ is the hydrogen atom or a monovalent hydrocarbon group, $R^6$ is a $C_1$ to $C_{20}$ monovalent hydrocarbon group, A is $R^6$ or —$R^4$—$COOR^5$, k is a positive integer, 1 is 0 or an integer with a value of at least 1, k+1 is at least 10, and k/(1+2)=5/1 to 500/1.

DETAILED DESCRIPTION OF THE PREFERRED EMBODIMENTS

The diorganopolysiloxane (A) used in the present invention is the base ingredient of the composition according to the present invention and is one of the essential components that characterizes the subject composition.

Diorganopolysiloxane (a) encompassed by diorganopolysiloxane (A) is diorganopolysiloxane endblocked by silanol at both molecular chain terminals. The viscosity of this diorganopolysiloxane at 25° C. must be from 0.02 to 1,000 Pa.s and preferably is from 1 to 100 Pa.s. Diorganopolysiloxane (a) is exemplified by silanol-endblocked dimethylpolysiloxanes, silanol-endblocked dimethylsiloxane-methylvinylsiloxane copolymers, silanol-endblocked dimethylsiloxane-methylphenylsiloxane copolymers, and silanol-endblocked methyl(3,3,3-trifluoropropyl)polysiloxanes. The silanol-endblocked dimethylpolysiloxanes are preferred.

Diorganopolysiloxane (b) is diorganopolysiloxane endblocked at one molecular chain terminal by silanol and endblocked at the other terminal by trialkylsiloxy. The viscosity of this diorganopolysiloxane at 25° C. must be from 0.1 to 1,000 Pa.s and preferably is from 1 to 100 Pa.s. Diorganopolysiloxane (b) is exemplified by dimethylpolysiloxanes endblocked by silanol at one molecular chain terminal and by trimethylsiloxy at the other terminal, dimethylsiloxane-methylvinylsiloxane copolymers endblocked by silanol at one molecular chain terminal and by trimethylsiloxy at the other terminal, dimethylsiloxane-methylphenylsiloxane copolymers endblocked by silanol at one molecular chain terminal and by trimethylsiloxy at the other terminal, and methyl(3,3,3-trifluoropropyl) polysiloxanes endblocked at both terminals by silanol.

The component (B) used in the present invention, which functions as a crosslinker for component (A), is organosilane with the general formula

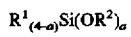

$R^1$ and $R^2$ each represent $C_1$ to $C_{20}$ monovalent hydrocarbon groups and a is 3 or 4 or the partial hydrolyzate thereof. Preferably $R^1$ is $C_8$ to $C_{20}$ alkyl and $R^2$ is $C_1$ to $C_2$ alkyl. Component (B) is specifically exemplified by tetramethoxysilane, tetraethoxysilane, tetraisoproxysilane, methyltrimethoxysilane, vinyltrimethoxysilane, decyltrimethoxysilane, methyltriethoxysilane, phenyltrimethoxysilane, and methyltri(ethoxymethoxy) silane. While a single selection from this class of compounds will ordinarily be used as component (B), 2 or more selections may be used in combination as necessary. The partial hydrolyzates of these compounds can also be used as component (B). Although the quantity of addition for component (B) is conditioned by a consideration of the amount of component (A) silanol (itself conditioned by the required post-cure properties), the starting materials added in addition to components (A) to (D), and impurities, such as water, that may be present in the starting materials, component (B) must be added at from 0.01 to 20 weight parts per 100 weight parts component (A). The use of more than 20 weight parts results in such adverse effects as incomplete curing and so forth.

The component (C) used in the present invention is also one of the components that characterizes the invention. This component (C) is used in order to provide a cured product having a highly controllable modulus and a high recovery ratio. Silicone oils, such as trimethylsiloxy-endblocked dimethylpolysiloxane oils, are already known for use as modulus regulators, but the use of silicone oils for this purpose is accompanied by problems such as post-cure outmigration and a reduction in the adhesiveness. On the other hand, the modulus can be freely adjusted through the addition of a resin, which is substantially free of the problems associated with the silicone oils. Moreover, this also leads to an improved recovery ratio and better results in durability testing. Component (C) is organopolysiloxane resin composed of the $R^3{}_3SiO_{1/2}$ unit (M unit), where $R^3$ represents $C_1$ to $C_{20}$ monovalent hydrocarbon groups as described above for $R^1$ and $R^2$ and $SiO_{4/2}$ unit (Q unit) with an M unit/Q unit molar ratio in the range from 0.5:1.0 to 1.2:1.0. The modulus can be adjusted even when the M unit is present at higher levels, but this condition leads, for example, to a deterioration in the compression set. Component (C) preferably contains no more than 1 weight % residual silanol: larger values cause a fruitless consumption of component (B). Component (C) is added at from 5 to 30 weight parts per 100 weight parts component (A).

The component (D) used in the present invention is a catalyst that accelerates the condensation curing reaction between component (A) and components (B) and (C). Insofar as the object of the present invention is not impaired, any catalyst known in the art for acceleration of the condensation reaction between components (A) and (B) can be used as component (D). Component (D) is exemplified by tin catalysts such as the dialkyltin dicarboxylates, dialkyltin bis (acetylacetonate)s, tin octoate, and so forth; iron octoate; zirconium octoate; titanate esters such as tetrabutyl titanate, tetra(i-propyl) titanate, dibutoxytitanium bis (acetylacetonate), and so forth; and amine catalysts such as tetramethylguanidine; however, component (D) is not limited to the preceding. While component (D) will generally consist of a single catalyst, two or more catalysts may be used in combination. In the case of use of a combination of two or more catalysts, the use is preferred of a combination of the tin catalysts, dibutyltin bisacetylacetonate and tin octoate. Component (D) must be added at from 0.01 to 20 weight parts per 100 weight parts component (A). Cure acceleration will be inadequate at below 0.01 weight part, while exceeding 20 weight parts causes adverse effects, such as a loss of water resistance and heat resistance, to appear to a substantial degree.

The component (E) used in the present invention, which is another component that characterizes the present invention, is used in order to increase the curability. $R^6$ in component (E) represents $C_1$ to $C_{20}$ monovalent hydrocarbon groups, for example, methyl, ethyl, propyl, pentyl, stearyl, 3,3,3-trifluoropropyl, beta-phenylethyl, alpha-methyl-beta-phenylethyl, vinyl, and phenyl. The groups $R^6$ within the single molecule need not all be identical. $R^6$ will most typically be methyl, but combinations of methyl with other groups are also commonly used. $R^5$ is the hydrogen atom or a monovalent hydrocarbon group, wherein the latter is exemplified by methyl, ethyl, and hexyl. A is $R^6$ or $-R^4{}_{COOR}{}^5$, and the subscript 1 may also be 0 when both A groups are $-R^4COOR^5$. $R^4$ represents divalent hydrocarbon groups, such as alkylene groups like $-CH_2-$, $-CH_2CH_2-$, $-CH_2CH_2CH_2-$, and $-CH_2CH(CH_3)CH_2-$ and alkylenearylene groups such as $-(CH_2)_2-C_6H_4-$. The $-R^4COOR^5$ groups may be present in terminal or nonterminal position on the molecular chain or at both positions. This component can be synthesized, for example, by the method provided in Canadian Patent No. 1,262,736, granted Nov. 7, 1989, to Keil et al.

The composition according to the present invention comprises the components (A) to (E) described above, but may also contain, insofar as the object of the present invention is not impaired, silanol-free diorganopolysiloxane; inorganic filler such as fumed silica, precipitated silica, quartz micropowder, carbon black, calcium carbonate, and so forth; the preceding inorganic fillers that have been subjected to a hydrophobing treatment; fluidity adjusters; silane-based and siloxane-based adhesion promoters; pigments; heat stabilizers; flame retardants; organic solvents; antimolds; and antimicrobials.

The room-temperature-curable silicone elastomer composition according to the present invention can be prepared simply by mixing the above-described components (A) to (E) to homogeneity. Desirable mixing sequences for components (A) to (E) are as follows: (i) the addition of components (A), (B), (C), (D), and (E) in the order given, or (ii) the preliminary mixing of components (B) to (E) to yield a mixture to which component (A) is then added. Failure to do this raises the possibility that in some cases the expected properties will not be obtained, particularly in regard to post-cure flexibility. With the exception of this consideration, the mixing sequence is not particularly critical.

The composition according to the present invention as described above supports facile control of its post-cure physical properties, particularly the hardness and modulus, and can provide a low-hardness, high-elongation silicone elastomer. The subject composition can pass the 10030 or 9030 durability test for building sealants stipulated in JIS A 5758 and is highly resistant to cure inhibition. Furthermore, this composition readily adheres to substrate in contact with the composition during the composition's cure. This property spectrum makes the composition according to the present invention particularly useful as, for example, an adhesive, coating, or building sealant.

The invention is explained in greater detail below through working examples, in which "parts" denotes "weight parts". The physical properties of the room-temperature-curable silicone elastomer compositions were measured by the methods specified in JIS A 5758, "Sealing compounds for sealing and glazing in buildings".

A silane-based primer (Primer D-2 from Dow Corning Toray Silicone Company, Limited) was used as the primer. The adherends were Alumite (sulfuric acid)-treated and sealed aluminum test panels as specified in JIS H 4100 (6063S) and were obtained from Nippon Test Panel Kabushiki Kaisha. The following diorganopolysiloxanes were used as the carboxyl-modified silicone (E).

diorganopolysiloxane A

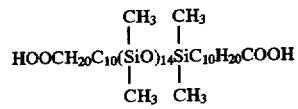

diorganopolysiloxane B

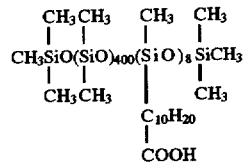

EXAMPLE 1

A room-temperature-curable silicone elastomer composition was prepared by mixing the following to homogeneity: 100 parts dimethylpolysiloxane consisting of the mixture, in a 1:1 molar ratio, of dimethylpolysiloxane (viscosity at 25° C.=12 Pa.s) endblocked at both molecular chain terminals by silanol and dimethylpolysiloxane (viscosity at 25° C.=12 Pa.s) endblocked at one molecular chain terminal by silanol and endblocked at the other terminal by trimethylsiloxy; 13 parts methylpolysiloxane resin composed of the $(CH_3)_3SiO_{1/2}$ and $SiO_{4/2}$ units in a 0.7:1 molar ratio and having a hydroxyl group content not exceeding 1 weight %; 3.0 parts decyltrimethoxysilane; 0.06 part dibutyltin dilaurate; 2.0 parts diorganopolysiloxane A; and 100 parts of a fatty acid-treated calcium carbonate micropowder (brand name: Viscolite U, from Shiraishi Kogyo Kabushiki Kaisha). The H-joint specified in JIS A 5758 was fabricated using this composition, and the 50% modulus, elongation, and maximum stress were measured. The 9030 and 10030 durability tests were also carried out. The measurement results are reported below.

| | | |
|---|---|---|
| 50% modulus | (kgf/cm²) | 1.8 |
| maximum stress | (kgf/cm²) | 10.2 |
| elongation | (%) | 750 |
| 9030 durability test | | pass |
| 10030 durability test | | pass |
| % cohesive failure in the rubber layer | | 100% |

EXAMPLE 2

A room-temperature-curable silicone elastomer composition was prepared by mixing the following to homogeneity:

100 parts dimethylpolysiloxane consisting of the mixture, in a 1:1 molar ratio, of dimethylpolysiloxane (viscosity at 25° C.=12 Pa.s) endblocked at both molecular chain terminals by silanol and dimethylpolysiloxane (viscosity at 25° C.=12 Pa.s) endblocked at one molecular chain terminal by silanol and endblocked at the other terminal by trimethylsiloxy; 13 parts methylpolysiloxane resin composed of the $(CH_3)_3SiO_{1/2}$ and $SiO_{4/2}$ units in a 0.7:1 molar ratio and having a hydroxyl group content not exceeding 1 weight %; 3.0 parts decyltrimethoxysilane; 0.06 part dibutyltin dilaurate; 2.0 parts diorganopolysiloxane B; and 100 parts of a fatty acid-treated calcium carbonate micropowder (brand name: Viscolite U, from Shiraishi Kogyo Kabushiki Kaisha). The properties of this composition were measured as in Example 1, and the measurement results are reported below.

| 50% modulus | (kgf/cm²) | 1.7 |
|---|---|---|
| maximum stress | (kgf/cm²) | 10.6 |
| elongation | (%) | 780 |
| 9030 durability test | | pass |
| 10030 durability test | | pass |
| % cohesive failure in the rubber layer | | 100% |

COMPARATIVE EXAMPLE 1

A room-temperature-curable silicone elastomer composition was prepared by mixing the following to homogeneity: 100 parts dimethylpolysiloxane consisting of the mixture, in a 1:1 molar ratio, of dimethylpolysiloxane (viscosity at 25° C.=12 Pa.s) endblocked at both molecular chain terminals by silanol and dimethylpolysiloxane (viscosity at 25° C.=12 Pa.s) endblocked at one molecular chain terminal by silanol and endblocked at the other terminal by trimethylsiloxy; 13 parts methylpolysiloxane resin composed of the $(CH_3)_3SiO_{1/2}$ and $SiO_{4/2}$ units in a 0.7:1 molar ratio and having a hydroxyl group content not exceeding 1 weight %; 3.0 parts decyltrimethoxysilane; 0.06 part dibutyltin dilaurate; 1.2 parts oleic acid; and 100 parts of a fatty acid-treated calcium carbonate micropowder (brand name: Viscolite U, from Shiraishi Kogyo Kabushiki Kaisha). The properties of this composition were measured as in Example 1, and the measurement results are reported below.

| 50% modulus | (kgf/cm²) | 1.7 |
|---|---|---|
| maximum stress | (kgf/cm²) | 10.6 |
| elongation | (%) | 780 |
| 9030 durability test | | pass |
| 10030 durability test | | pass |
| % cohesive failure in the rubber layer | | 0% |

Effects of the Invention

Because the room-temperature-curable silicone elastomer composition according to the present invention comprises components (A) to (E) and in particular because it contains the special diorganopolysiloxane (A), organopolysiloxane resin (C), and special diorganopolysiloxane (E), the said composition characteristically has an excellent pre-cure workability and cures to give a highly durable, low-modulus, and high-elongation silicone elastomer.

That which is claimed is:

1. A room-temperature-curable silicone elastomer composition comprising
   (A) 100 weight parts of diorganopolysiloxane composed of
      (a) diorganopolysiloxane with a viscosity at 25° C. of 0.02 to 1,000 Pa.s that is endblocked by silanol at both molecular chain terminals and
      (b) diorganopolysiloxane with a viscosity at 25° C. of 0.1 to 1,000 Pa.s that is endblocked at one molecular chain terminal by silanol and at the other terminal by trialkylsiloxy in a molar ratio in the range from 1.0:0.3 to 1.0:3.0 moles of (a) to moles of (b);
   (B) 0.1 to 20 weight parts of organosilane with the general formula

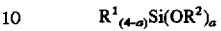

$R^1$ and $R^2$ each represent $C_1$ to $C_{20}$ monovalent hydrocarbon groups and a is 3 or 4 or partial hydrolyzate thereof;
   (C) 5 to 30 weight parts of organopolysiloxane resin that is solid at ambient temperature and that is composed of the $R^3_3SiO_{1/2}$ and $SiO_{4/2}$ units in a molar ratio in the range from 0.5:1.0 to 1.2:1.0 and where $R^3$ is a $C_1$ to $C_{20}$ monovalent hydrocarbon group or the hydroxyl group
   (D) 0.01 to 20 weight parts of curing catalyst; and
   (E) 0.5 to 10 weight parts diorganopolysiloxane having at least 2 —$R^4$—$COOR^5$ groups in each molecule and having the following average general formula

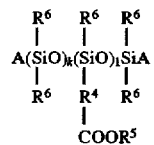

wherein $R^4$ is a divalent hydrocarbon group, $R^5$ is the hydrogen atom or a monovalent hydrocarbon group, $R^6$ is a $C_1$ to $C_{20}$ monovalent hydrocarbon group, A is $R^6$ or —$R^4$—$COOR^5$, k is a positive integer, l is 0 or an integer with a value of at least 1, k+l is at least 10, and k/(l+2)=5/1 to 500/1.

2. The room-temperature-curable silicone elastomer composition according to claim 1, in which the moles of component (a): moles of component (b) have a molar ratio in the range from 1.0:0.5 to 1.0:3.0.

3. The room-temperature-curable silicone elastomer composition according to claim 1, in which in component (B), $R_1$ is $C_8$ to $C_{20}$ alkyl, $R^2$ is $C_1$ or $C_2$ alkyl, and a is 3.

4. The room-temperature-curable silicone elastomer composition according to claim 1, in which $R^3$ in component (C) is methyl.

5. The room-temperature-curable silicone elastomer composition according to claim 1, in which component (C) has a hydroxyl content no greater than 1 weight %.

6. The room-temperature-curable silicone elastomer composition according to claim 1, in which the curing catalyst (D) is an organotin compound.

7. The room-temperature-curable silicone elastomer composition according to claim 1, is a silicone building sealant composition.

8. A method of making a room-temperature-curable silicone elastomer composition comprising mixing the following ingredients in the order listed
   (A) 100 weight parts of diorganopolysiloxane composed of
      (a) diorganopolysiloxane with a viscosity at 25° C. of 0.02 to 1,000 Pa.s that is endblocked by alkanol at both molecular chain terminals and
      (b) diorganopolysiloxane with a viscosity at 25° C. of 0.1 to 1,000 Pa.s that is endblocked at one molecular chain terminal by silanol and at the other terminal by trialkylsiloxy in a molar ratio in the range from 1.0:0.3 to 1.0:3.0 moles of (a) to moles of (b);

(B) 0.1 to 20 weight parts of organosilane with the general formula $$R^1_{(4-a)}Si(OR^2)_a$$

$R^1$ and $R^2$ each represent $C_1$ to $C_{20}$ monovalent hydrocarbon groups and a is 3 or 4 or partial hydrolyzate thereof;

(C) 5 to 30 weight parts of organopolysiloxane resin that is solid at ambient temperature and that is composed of the $R^3_3SiO_{1/2}$ and $SiO_{4/2}$ units in a molar ratio in the range from 0.5:1.0 to 1.2:1.0 and where $R^3$ is a $C_1$ to $C_{20}$ monovalent hydrocarbon group or the hydroxyl group (D) 0.01 to 20 weight parts curing catalyst; and (E) 0.5 to 10 weight parts diorganopolysiloxane having at least 2 —$R^4$—$COOR^5$ groups in each molecule and having the following general formula $$\begin{array}{ccc} R^6 & R^6 & R^6 \\ | & | & | \\ A(SiO)_k(SiO)_lSiA \\ | & | & | \\ R^6 & R^4 & R^6 \\ & | \\ & COOR^5 \end{array}$$

wherein $R^4$ is a divalent hydrocarbon group, $R^5$ is the hydrogen atom or a monovalent hydrocarbon group, $R^6$ is a $C_1$ to $C_{20}$ monovalent hydrocarbon group, A is $R^6$ or —$R^4$—$COOR^5$, k is a positive integer, 1 is 0 or an integer with a value of at least 1, k+1 is at least 10, and k/(1+2)=5/1 to 500/1.

9. A method of making a room-temperature-curable silicone elastomer composition comprising (i) mixing (B) 0.1 to 20 weight parts of organosilane with the general formula $$R^1_{(4-a)}Si(OR^2)_a$$

$R^1$ and $R^2$ each represent $C_1$ to $C_{20}$ monovalent hydrocarbon groups and a is 3 or 4 or partial hydrolyzate thereof;

(C) 5 to 30 weight parts of organopolysiloxane resin that is solid at ambient temperature and that is composed of the $R^3_3SiO_{1/2}$ and $SiO_{4/2}$ units in a molar ratio in the range from 0.5:1.0 to 1.2:1.0 and where $R^3$ is a $C_1$ to $C_{20}$ monovalent hydrocarbon group or the hydroxyl group (D) 0.01 to 20 weight parts of curing catalyst; and (E) 0.5 to 10 weight parts of diorganopolysiloxane having at least 2 —$R^4$—$COOR^5$ groups in each molecule and having the following average general formula $$\begin{array}{ccc} R^6 & R^6 & R^6 \\ | & | & | \\ A(SiO)_k(SiO)_lSiA \\ | & | & | \\ R^6 & R^4 & R^6 \\ & | \\ & COOR^5 \end{array}$$

wherein $R^4$ is a divalent hydrocarbon group, $R^5$ is the hydrogen atom or a monovalent hydrocarbon group, $R^6$ is a $C_1$ to $C_{20}$ monovalent hydrocarbon group, A is $R^6$ or —$R^4$—$COOR^5$, k is a positive integer, 1 is 0 or an integer with a value of at least 1, k+1 is at least 10, and k/(1+2)=5/1 to 500/1, and (ii) thereafter admixing into the resulting mixture of (i)

(A) 100 weight parts of diorganopolysiloxane composed of (a) diorganopolysiloxane with a viscosity at 25° C. of 0.02 to 1,000 Pa.s that is endblocked by silanol at both molecular chain terminals and (b) diorganopolysiloxane with a viscosity at 25° C. of 0.1 to 1,000 Pa.s that is endblocked at one molecular chain terminal by silanol and at the other terminal by trialkylsiloxy in a molar ratio in the range from 1.0:0.3 to 1.0:3.0 moles of (a) to moles of (b).

* * * * *